United States Patent
McFarland et al.

(10) Patent No.: US 6,754,540 B1
(45) Date of Patent: Jun. 22, 2004

(54) FLOWCHART-BASED CONTROL SYSTEM INCLUDING EXTERNAL FUNCTIONS

(75) Inventors: Michael McFarland, Somerset Center, MI (US); James Steenstra, Ann Arbor, MI (US); Lee Reid, Ann Arbor, MI (US); James Behm, Ann Arbor, MI (US); Joseph Gasiorek, Ann Arbor, MI (US); Kurudi Muralidhar, Novi, MI (US); Thomas Harkaway, Saline, MI (US)

(73) Assignee: Entivity, Inc., Ann Arbor, MI (US)

( * ) Notice: Subject to any disclaimer, the term of this patent is extended or adjusted under 35 U.S.C. 154(b) by 332 days.

(21) Appl. No.: 09/624,449

(22) Filed: Jul. 24, 2000

(51) Int. Cl.[7] ............................................... G05B 11/01
(52) U.S. Cl. ........................ 700/18; 717/140; 717/157; 717/106; 700/83; 700/86
(58) Field of Search ............................. 700/18, 86, 17; 717/131–133, 140, 144, 156–157, 162, 106; 345/700, 762, 763

(56) References Cited

U.S. PATENT DOCUMENTS

| | | | |
|---|---|---|---|
| 5,893,105 A | * | 4/1999 | MacLennan ................. 707/102 |
| 6,118,448 A | * | 9/2000 | McMillan et al. ........... 717/127 |
| 6,212,672 B1 | * | 4/2001 | Keller et al. ................. 717/104 |
| 6,421,821 B1 | * | 7/2002 | Lavallee ...................... 717/109 |

* cited by examiner

Primary Examiner—Ramesh Patel
Assistant Examiner—Ronald D Hartman, Jr.
(74) Attorney, Agent, or Firm—Harness, Dickey & Pierce, P.L.C.

(57) ABSTRACT

A flowchart-based programming and control system includes a computer with a processor, memory, and a display. A device is associated with a process. A flowcharting module executed by the computer generates and edits flowchart source code that contains action and decision blocks which define logic for operating the device to further the process. An external function can be called from one of the action and decision blocks during run time. The external function is executed by an external function module which receives input parameters and generates return values. The external function is preferably a dynamic link library (DLL). Since the external functions are loaded during run time only when they are needed, they do not consume system memory until they are used. The external functions provide an open architecture for the flowchart-based programming and control system and allows third parties to incorporate proprietary algorithms, complex math functions, and other application-specific functions to the flowcharting module.

10 Claims, 5 Drawing Sheets

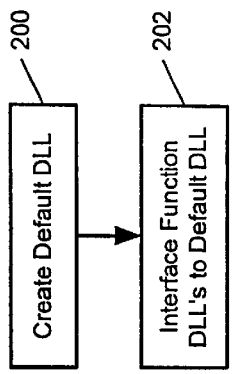
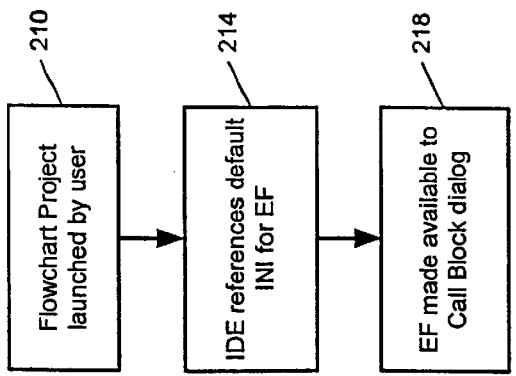
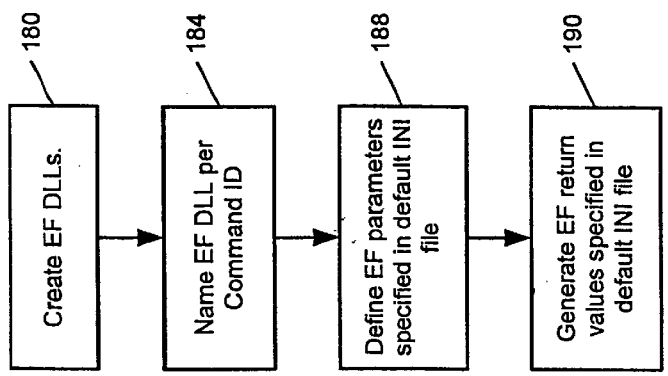
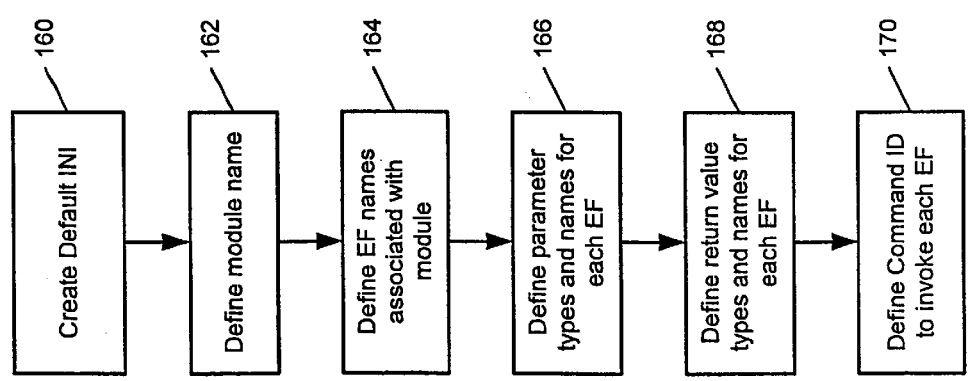

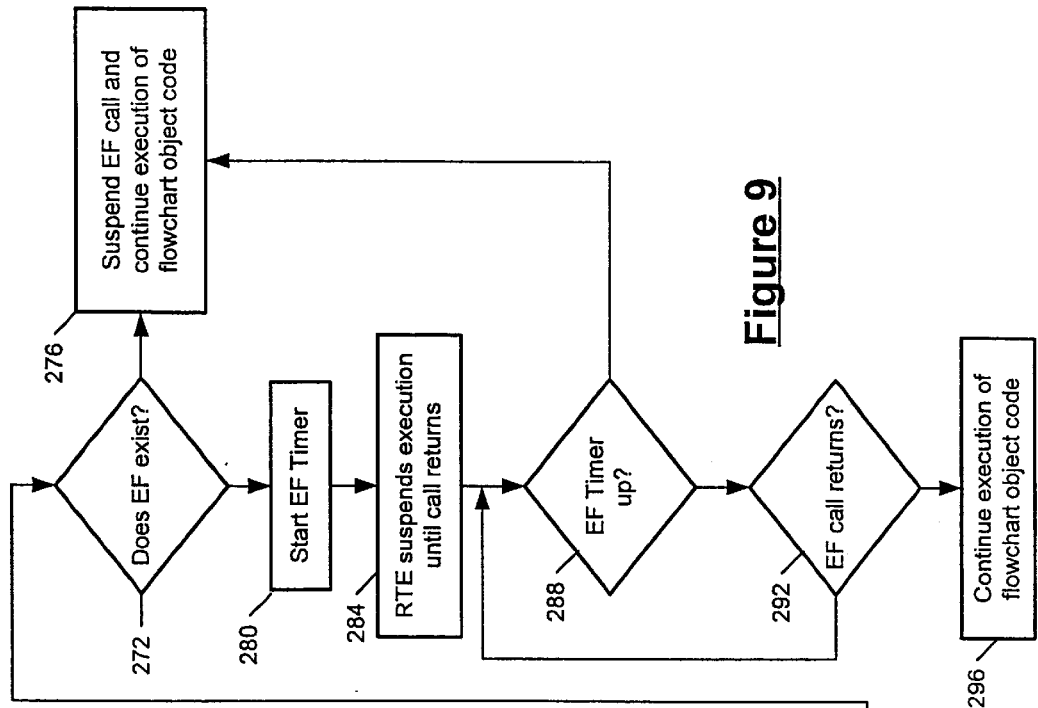
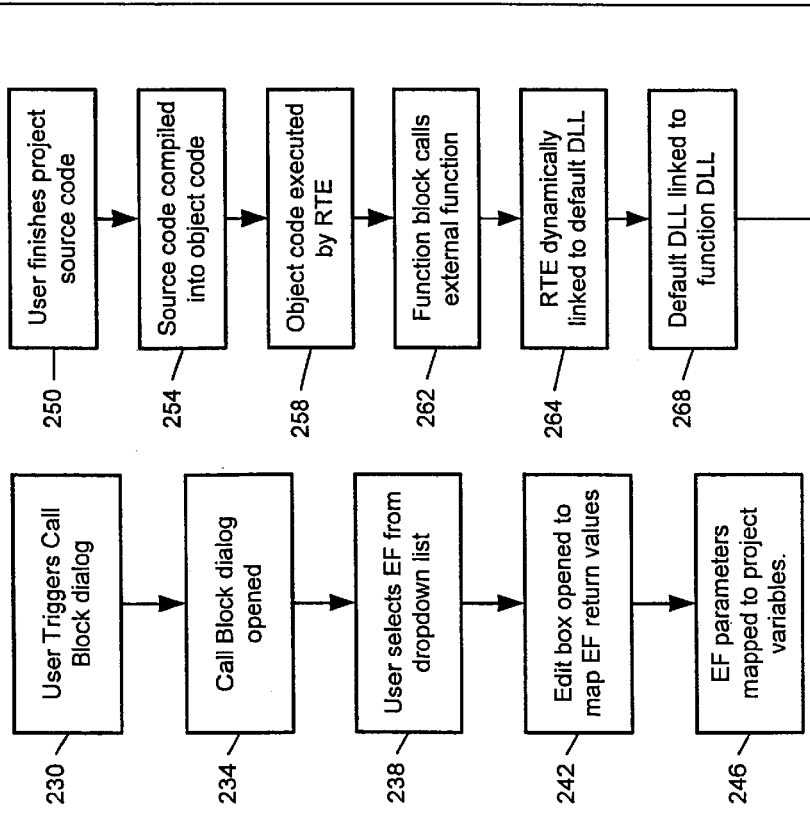
Figure 8
Figure 9

FLOWCHART-BASED CONTROL SYSTEM INCLUDING EXTERNAL FUNCTIONS

BACKGROUND AND SUMMARY OF THE INVENTION

The present invention relates to programming and control systems. More particularly, this invention relates to flowchart-based programming and control systems that call external functions from the flowchart.

Programming and control systems are generally used for controlling processes that involve devices such as relays, solenoids, motors, valves, switches, and other electrical and electromechanical devices. The processes that are controlled include machining, drilling, welding, spraying paint, mixing materials, assembling parts, handling materials, etc. Conventional programming and control systems generally used ladder diagrams and relay ladder logic (RLL) to control the operation of the devices associated with the processes. In practice, however, programmers tend to use a flowchart to initially define the operation of the devices in the process. Then, the programmers manually translate the flowchart into the ladder diagrams. The programmers employ the flowcharts as a first step because the flowcharts emulate human thought processes whereas the ladder diagrams do not.

Flowcharts generally include action blocks which represent an operation or action based on current input and output data. Action blocks generally have one entry point at the top and one exit point at the bottom. A branching or decision block is a diamond-shaped block which represents a branch in the control path based on the results of a decision. Branching blocks generally have one entry point at the top and two exit points at the side and the bottom. Using the action and branching blocks, a programmer creates a flowchart which controls one or more devices that are associated with a process. In contrast, some RLL controllers include over two hundred distinct instructions which are understandably difficult to remember, let alone implement. Flowcharts dramatically simplify the programming and control of the devices. One flowchart-based system is disclosed in "Continuous Flowchart, Improved Data Format and Debugging System For Programming and Operation of Machines", U.S. Pat. No. 4,852,047, which is hereby incorporated by reference.

A significant problem encountered with both flowchart-based and RLL-based programs is the integration of custom functions such as proprietary algorithms, complex mathematical calculations, and/or other application-specific functions. As a programmer, it is impossible to accommodate all of the unique applications for a programming and control system in advance. Even if it could be done, the resulting system would require too much memory and other system resources. If the proprietary algorithms and/or special functions are incorporated into the flowchart-based program, any corrections, changes, or improvements to the algorithms and/or special functions may affect the operation of the entire program.

The flowchart-based programming and control system according to the invention provides an open programming environment. The system incorporates external functions which can be called from flowchart blocks. The external functions are loaded during run time only when they are needed. Therefore, the external functions do not consume system memory until they are used. Because the external functions are stored in a separate file, a programmer can make corrections, changes, and/or improvements to the external function without affecting the operation of the flowchart-based programming and control system which calls the external function. Furthermore, because the external function may contain an external function that is used in a variety of circumstances, the programmer can reuse external function for multiple flowchart-based programming and control applications as well as non-flowchart based programs.

For a more complete understanding of the invention, its objects and advantages, reference may be had to the following specification and to the accompanying drawings.

BRIEF DESCRIPTION OF THE DRAWINGS

FIG. 4 is a flowchart depicting steps for creating a default initialization file that defines external function names, parameters and return values;

FIG. 5 is a flowchart depicting steps for creating the external function dynamic link libraries that map to the external functions identified in the default initialization file of FIG. 4;

FIG. 6 is a flowchart depicting steps for creating a default dynamic link library that is associated with a flowchart project and that interfaces with the external function dynamic link libraries of FIG. 5;

FIG. 7 is a flowchart depicting steps for making the previously-defined external functions available to the flowchart-based programming and control system;

FIG. 8 is a flowchart illustrating steps for adding an external function to a flowchart block during execution of the flowchart module; and FIG. 9 is a flowchart illustrating run time execution of external functions.

DETAILED DESCRIPTION OF THE PREFERRED EMBODIMENTS

Figure 1:
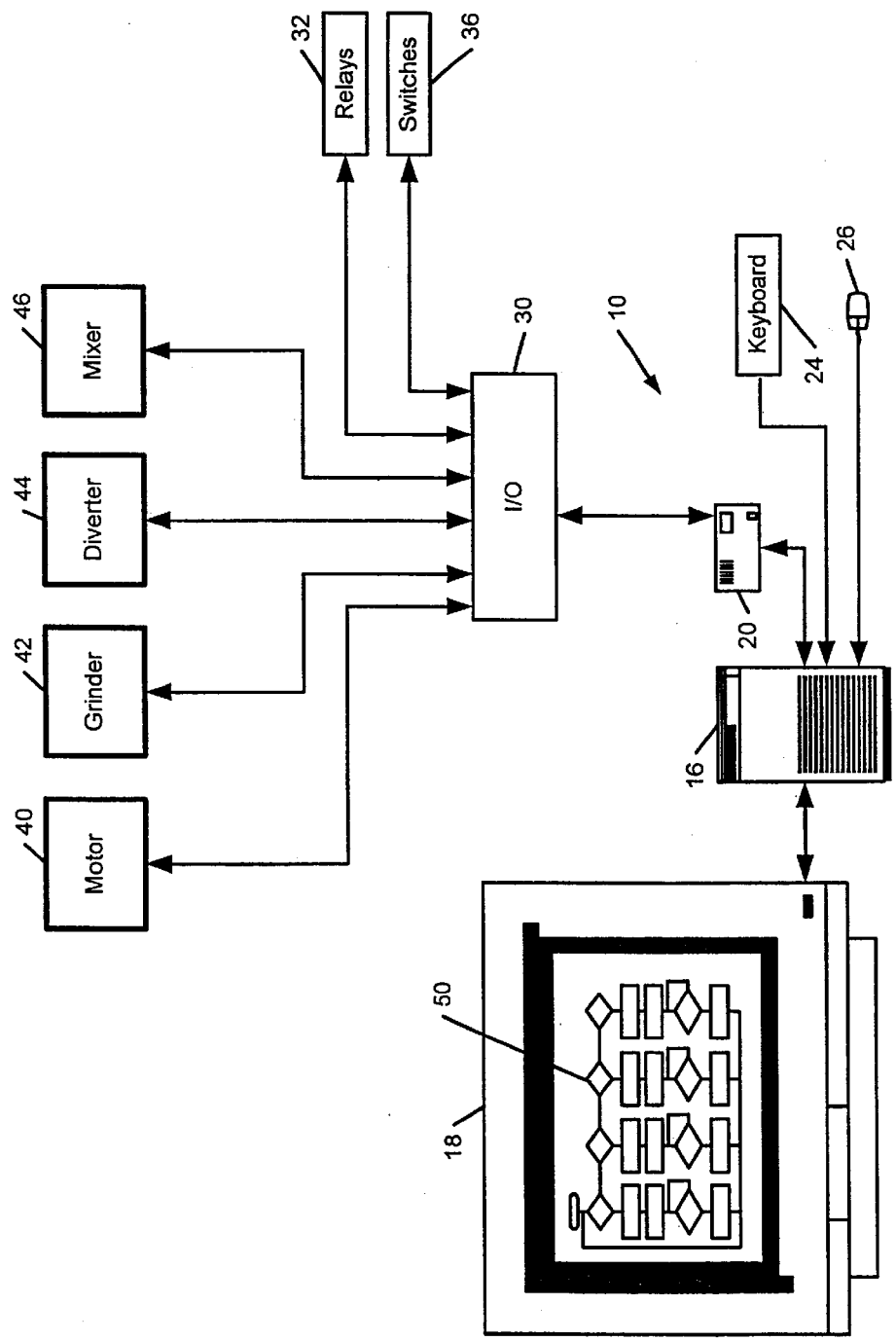
FIG. 1 is a functional block diagram of a flowchart-based programming and control system according to the invention.

Referring to FIG. 1, a programming and control system 10 is illustrated and includes a computer 16 that is connected to a display 18. The computer 16 includes an input/output (I/O) card 20 such as an Ethernet card, a keyboard 24 and a mouse 26. The computer 16 is connected to I/O network 30 such as an Ethernet network which is connected to a plurality of devices such as one or more relays 32, one or more switches 36, motor 40, grinder 42, diverter 44, and mixer 46. The computer 16 includes a flowchart module which provides a graphical user interface (GUI) or human-machine interface (HMI) for programming logic that controls the devices to further a process. The flowchart module is located in memory associated with the computer 16. The flowchart module allows a user to generate a flowchart 50 on the display 18 using convention point and click techniques with the keyboard 24 and/or the mouse 26. While an Ethernet card and network are shown, other I/O cards and networks can be employed without departing from the spirit of the invention.

Figure 2:
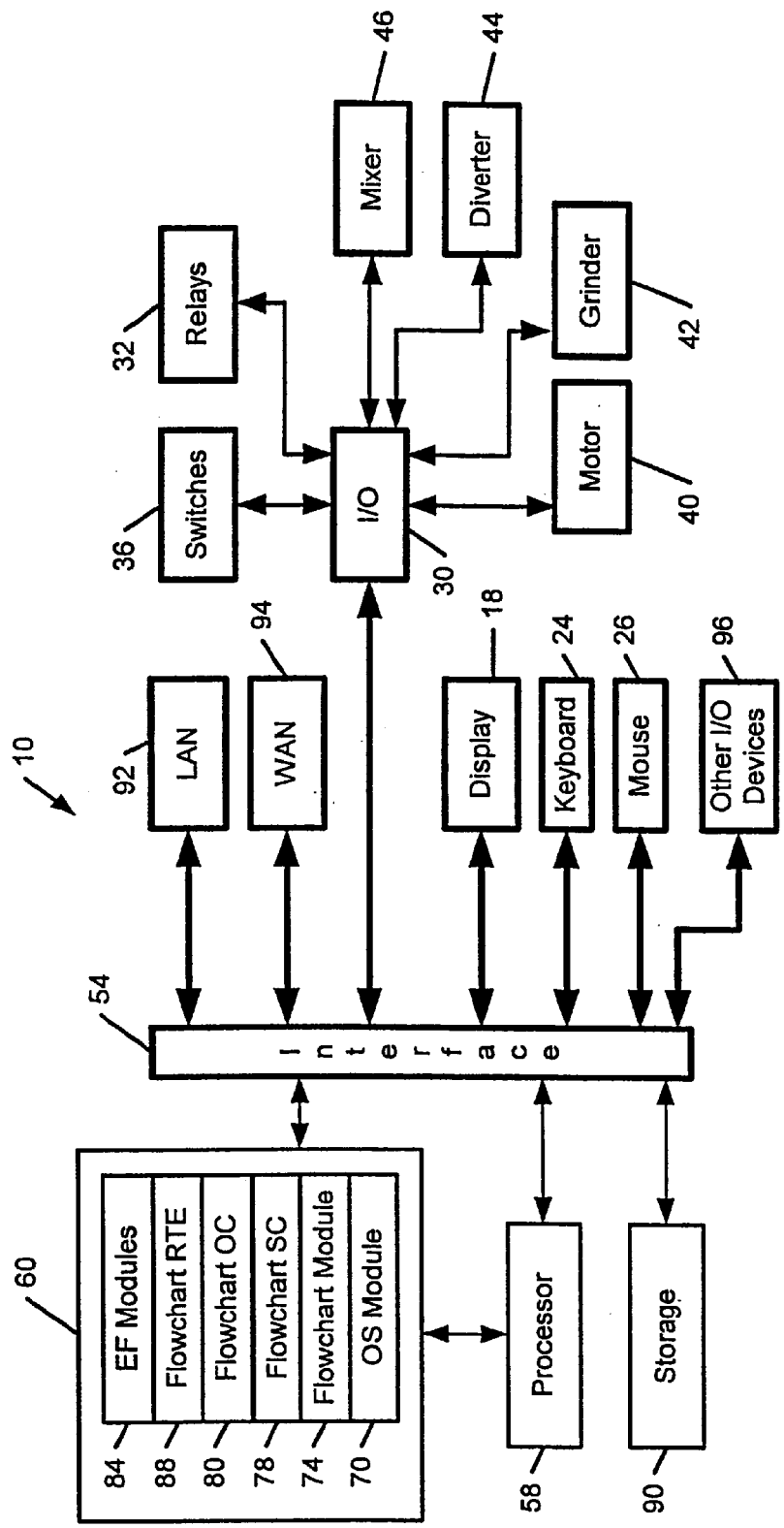
FIG. 2 is a functional block diagram of the flowchart-based programming and control system of FIG. 1 in further detail.

Referring now to FIG. 2, the programming and control system 10 includes an I/O interface 54 which is connected to a processor 58 and memory 60 which can include random access memory (RAM) and read-only memory (ROM). The memory 60 contains an operating system module 70 and a flowchart module 74. As a user creates, edits and modifies the flowchart 50, the flowchart module 74 generates flowchart source code 78. When the user completes the flowchart 50, the user compiles the flowchart source code 78 using the flowchart module 74 and creates the flowchart object code 80. The user incorporates one or more external function modules 84 into the flowchart 50 using the GUI or HMI by interfacing the external function(s) with one or more blocks associated with the flowchart 50 as will be described further below. The external function modules 84 contain proprietary algorithms, math functions, and/or other specialized functions that are not provided by the flowchart module 74.

The flowchart object code 80 is executed by a flowchart run time engine 88. The external function modules 84 are executable routines which serve a specific function or a set of functions. The external function modules 84 are stored separately as files and are loaded only when they are called by the flowchart run time engine 88. More specifically, the external function modules 84 are loaded into memory when the flowchart run time engine 88 encounters a block in the flowchart object code 80 containing a call to the external function modules 84. The external function modules 84 are loaded only when they are needed. Therefore, they do not consume any system memory until they are used. Because the external function module 84 is a separate file, a programmer can make corrections and/or improvements to the external function without affecting the operation of the flowchart object code 80 that calls the external function module 84 or any other external function module. Furthermore, the external function 84 can be used with other flowchart applications.

The I/O interface 54 is also connected to a storage device such as a hard drive, optical storage, etc. The I/O interface 54 is also connected to a local area network (LAN) 92, and a wide area network (WAN) 94 which is connected to (LAN) the internet.

Figure 3:
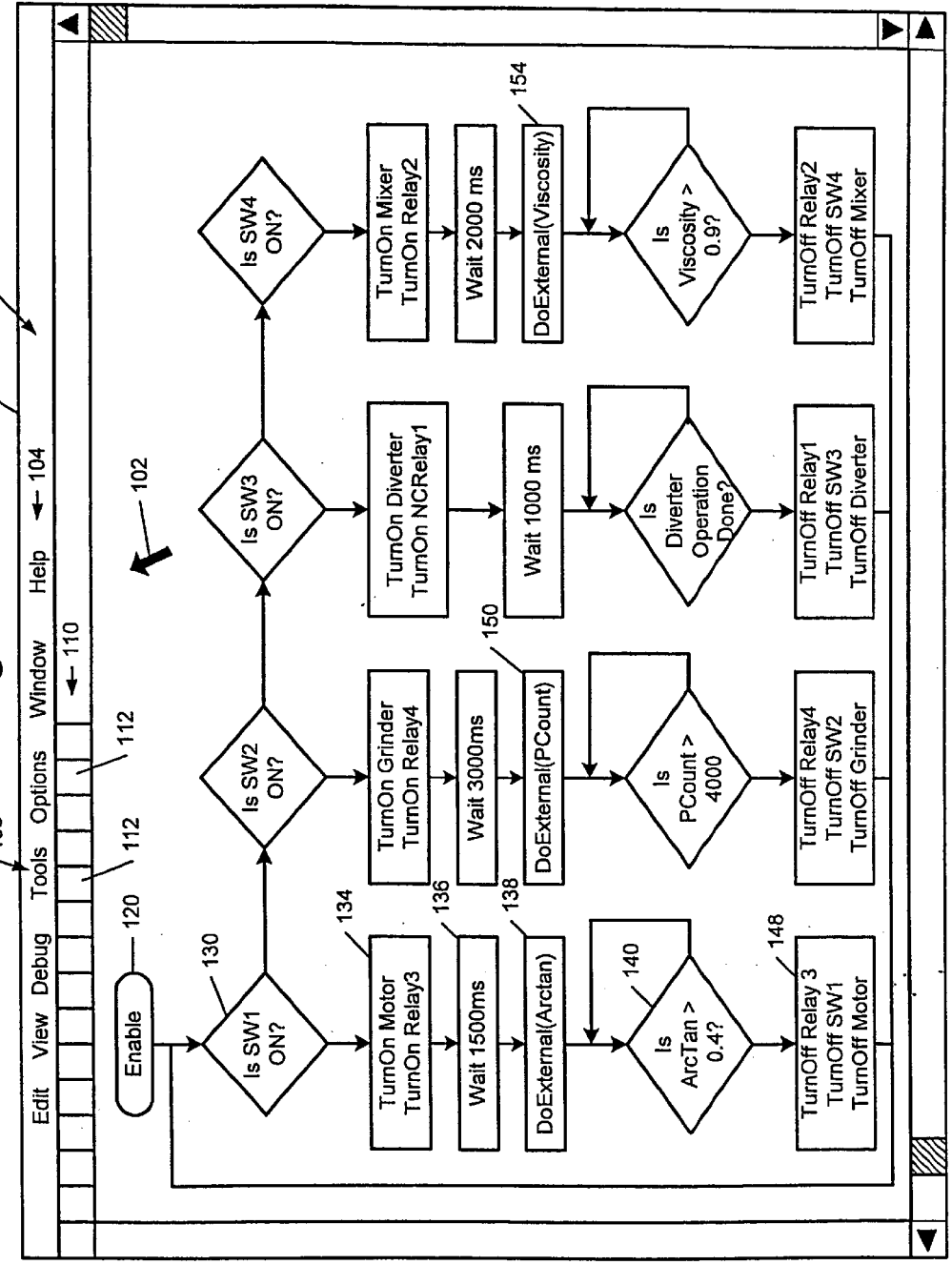
FIG. 3 illustrates an exemplary flowchart that is created using the flowchart-based programming and control system.

Referring now to FIG. 3, the flowchart 50 is illustrated in further detail. A GUI or HMI 100 for the programming and control system 10 includes a menu bar 104 with one or more drop-down menus 106. The GUI or HMI 100 also includes a toolbar 110 including one or more tools 112. The graphical user interface allows a user to create the flowchart 50 using the keyboard 24 and/or the mouse 26 in a conventional point-and-click manner.

The flowchart 50 includes an enable block 120, one or more decision blocks 130, and one or more action blocks 134. In the exemplary process illustrated in FIG. 3, control starts at the enable block 120 and continues with step 130 where control determines whether a switch associated with the motor 40 is on. If the switch is on, control continues with step 134 where control turns on the motor 40. Control turns on a normally closed relay associated with the diverter 44. Control waits 1,500 milliseconds in step 136 and then control continues with step 138 where control calls an external function ARCTAN, which is a math function. At step 140, control determines whether the result of the function ARCTAN is greater than 0.4. If not, control repeats step 140 until the result of the external function ARCTAN is greater than 0.4. Then, control continues with step 148 where control turns off the normally closed relay associated with the diverter 44, turns off the switch associated with the motor 40, and turns off the motor 40. Control then continues with step 130. The devices (the grinder 42, the diverter 44 and the mixer 46) are controlled in a similar manner and call other external functions (PCount and Viscosity) in steps 150 and 154.

Referring now to FIG. 4, the steps for integrating an external function with a flowchart programming and control system 10 are illustrated. At step 160, the user creates a default initialization file for a flowchart project that is associated with the flowchart 50. The initialization file stores information related to the external functions that are to be connected to the project containing the flowchart 50. At step 162, the user defines a module name. At step 164, the user defines external function names that are associated with the module. At step 166, the user defines parameter types and names for each external function. At step 168, the user defines return value types and names for each external function. At step 170, the user defines a command identification (ID) that is used to invoke each external function.

The calling program (the flowchart) passes parameters to the external function. The external function performs mathematical functions or other algorithms on the parameters and generates a return value to the calling program (the flowchart). In a preferred embodiment, the computer 16 runs an operating system (OS) such as Windows 95®, Windows 98®, Windows 2000®, Windows NT®, or Apple®-based OS. The external functions are preferably programmed using dynamic link libraries (DLL) in C++, Visual Basic or other suitable languages. Skilled artisans can appreciate that other operating systems and programming languages can be used to generate the external functions.

Referring now to FIG. 5, the user creates the external function DLLs at step 180. At step 184, the user names the external function DLL consistently with a command ID that will be used to call the external function. At step 188, the user codes the external function to accept the parameters specified in the default initialization file. At step 190, the user codes the external function to provide the specified math function or algorithm on the parameters and to generate the return values that are specified in the default initialization file.

Referring now to FIG. 6, the user defines a default DLL file that is associated with the project in the flowchart 50 at step 200. At step 202, the user interfaces the function DLLs to the default DLL.

Referring now to FIG. 7, the user launches a flowchart project at step 210. An Integrated Development Environment (IDE) module associated with the programming and control system 10 references the default initialization file for the names of the external functions that are available at step 214. At step 218, the programming and control system makes the external functions available to a call block dialog box which allows a user to add and interface external functions to flowchart blocks.

Referring now to FIG. 8, a user triggers the call block dialog box using the menu bar 104 and/or the tool bar 110 at step 230. At step 234, a user opens the call block dialog box. At step 238, a user selects the external function from a drop-down list. At step 242, the flowchart module 84 opens an edit box and allows a user to map the external function return values to local variables of the flowchart 50. At step 246, the user maps external function parameters to local variables associated with the flowchart 50.

Referring now to FIG. 9, the user finishes the flowchart source code at step 250. The user compiles the flowchart source code into object code at step 254. At step 258, the user runs the flowchart 50 and the flowchart object code is executed by a run time engine (RTE). At step 262, a function block contained in the flowchart 50 calls the external function. At step 264, the RTE is dynamically linked to the default DLL file. At step 268, the default DLL is dynamically linked to the function DLL file. At step 272, control determines whether the external function called by the flowchart 50 exists. If not, the RTE suspends the external function call and continues execution of the flowchart object code. Otherwise, the RTE starts an external function timer at step 280. At step 284, the RTE suspends execution of the flowchart object code until the external function call returns. At step 288, control determines whether the external function timer has timed out. If the EF timer has timed out, the external function is suspended and the RTE continues executing the flowchart object code. If not, control determines whether the external function call has returned at step 292. If the external function call has not returned at step 292, control continues with step 288. Otherwise, control ends at step 296 where the RTE continues execution of the flowchart object code.

The invention is ideally suited for incorporating external function such as proprietary algorithms, complex math functions, and other custom functions into the flowchart programming and control system. Advantageously, the external functions are stored separately as files and are loaded only when needed by a block of flowchart. The external function is loaded only when it is needed, therefore it does not consume memory until it is used. By incorporating the external functions at run time, the performance of the flowchart programming and control system is not impacted until necessary. Because the external function is a separate file, a programmer can make corrections and/or improvements to the external functions without affecting the operation of the flowchart calling program. The external function can also be used with other programs.

The machine programming and control system provides a flexible interface for third party implementers of special functions. By providing an open architecture, the present invention dramatically improves the versatility of the flowchart programming and control system. A time-out mechanism is built-in to handle external functions which do not perform correctly.

While the invention has been described in its presently preferred form, it will be understood that the invention is capable of certain modification and change without departing from the spirit of the invention as set forth in the appended claims.

What is claimed is:

1. A programming and control system, comprising:
   a computer including a processor, memory and a display that runs an operating system with a graphical user interface;
   a device associated with a process;
   a flowcharting module executed by said computer that generates and edits flowchart source code that contains action and decision blocks which define logic for operating said device to further said process, wherein an external function is added using said graphical user interface and can be called from one of said action and decision blocks; and
   an external function module executed by said computer that performs said external function, said external function module being stored in a library that includes at least one said external function module, said flowcharting module being logically separate from said library;
   wherein said external function module includes input parameters and output return values, and wherein said flowchart module includes a dialog box for mapping said input parameters and said output return values to local variables of said flowchart.

2. The programming and control system of claim 1, further comprising:
   a compiler associated with said flowcharting module that creates flowchart object from said flowchart source code.

3. The programming and control system of claim 2, further comprising:
   a run-time engine that executes said flowchart object code.

4. The programming and control system of claim 3, wherein said run-time engine dynamically links said flowchart object code and said external function module when said one of said action and decision blocks calls said external function during execution of said flowchart object code.

5. The programming and control system of claim 4, further comprising:
   a timer that is started when said external function is called, wherein said run-time engine suspends said external function and continues executing said flowchart object code if said timer reaches a first period before said external function generates said return values.

6. A method for programming and controlling a device associated with a process, comprising the steps of:
   generating a flowchart and flowchart source code using a flowcharting module associated with a computer,
   creating action and decision blocks in said flowchart that control said device to further said process; and
   interfacing an external function module that receives input parameters from said flowchart and generates return values to one of said action and decision blocks, said external function module being stored in a library that includes at least one said external function module, said flowcharting module being logically separate from said library;
   mapping local variables associated with said flowchart to said input parameters and said return values;
   compiling said flowchart source code to create flowchart object code; and
   dynamically linking said external function module to said flowchart object code at run-time when said one of said action and decision blocks calls said external function during execution of said flowchart object code.

7. The method of claim 6, further comprising the step of: starting a timer when said external function is called.

8. The method of claim 7, further comprising the steps of: suspending execution of said external function if said timer reaches a first period before said external function module generates said return values.

9. A programming and control system, comprising:
   a computer including a processor, memory and a display that runs an operating system with a graphical user interface;
   a device associated with a process;
   a flowcharting module executed by said computer that generates and edits flowchart source code that contains action and decision blocks which define logic for operating said device to further said process, wherein an external function is added using said graphical user interface and can be called from one of said action and decision blocks; and
   an external function module executed by said computer that performs said external function,
   wherein said external function module includes input parameters and output return values, and wherein said flowchart module includes a dialog box for mapping said input parameters and said output return values to local variables of said flowchart;

a compiler associated with said flowcharting module that creates flowchart object code from said flowchart source code;

a run-time engine that executes said flowchart object code, wherein said run-time engine dynamically links said flowchart object code and said external function module when said one of said action and decision blocks calls said external function during execution of said flowchart object code; and a timer that is started when said external function is called, wherein said run-time engine suspends said external function and continues executing said flowchart object code if said timer reaches a first period before said external function generates said return values.

10. A method for programming and controlling a device associated with a process, comprising the steps of:

generating a flowchart and flowchart source code using a flowcharting module associated with a computer;

creating action and decision blocks in said flowchart that control said device to further said process;

interfacing an external function module that receives input parameters from said flowchart and generates return values to one of said action and decision blocks;

mapping local variables associated with said flowchart to said input parameters and said return values;

compiling said flowchart source code to create flowchart object code;

dynamically linking said external function module to said flowchart object code at run-time when said one of said action and decision blocks calls said external function during execution of said flowchart object code;

starting a timer when said external function is called; and suspending execution of said external function if said timer reaches a first period before said external function module generates said return values.

* * * * *

UNITED STATES PATENT AND TRADEMARK OFFICE
CERTIFICATE OF CORRECTION

PATENT NO. : 6,754,540 B1
DATED : June 22, 2004
INVENTOR(S) : Michael McFarland et al.

It is certified that error appears in the above-identified patent and that said Letters Patent is hereby corrected as shown below:

Title page,
Item [56], References Cited, U.S. PATENT DOCUMENTS, insert the following:
-- 5,963,446        10/1999      Klein et al
   4,852,047         7/1989      Lavallee
   US-2002/0087343   7/2002      Reid --

Column 6,
Line 4, after "object" insert -- code --.

Signed and Sealed this

Thirty-first Day of May, 2005

JON W. DUDAS
*Director of the United States Patent and Trademark Office*